United States Patent Office 3,263,728
Patented August 2, 1966

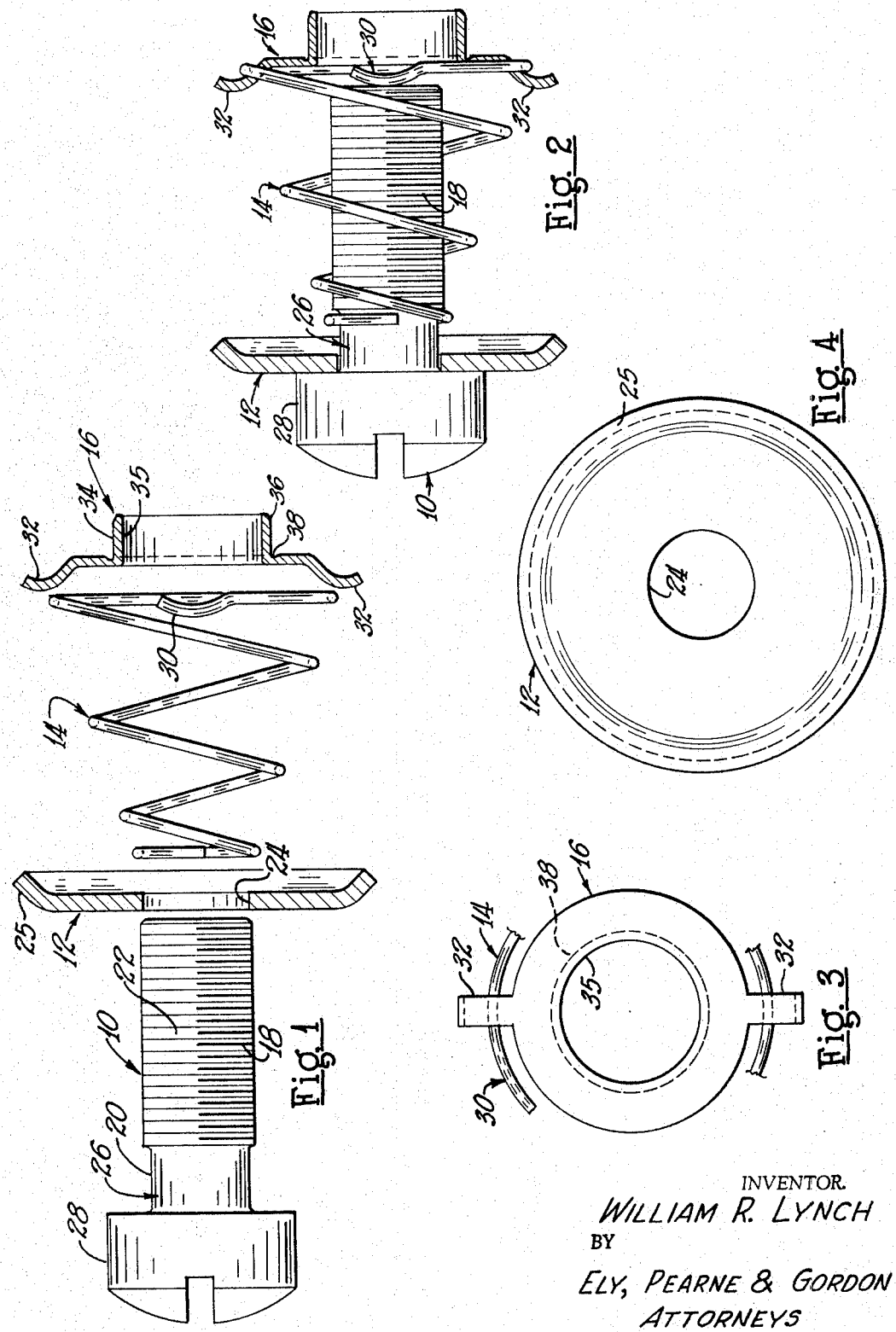

3,263,728
CAPTIVE BOLT
William R. Lynch, Birmingham, Mich., assignor to Republic Industrial Corporation, New York, N.Y., a corporation of Delaware
Filed Feb. 20, 1964, Ser. No. 346,245
5 Claims. (Cl. 151—69)

This invention relates to the art of fasteners; and more particularly to a captive bolt for the purpose of eliminating loose parts as in the mounting and removal of service panels and the like.

The problem

Removable service panels are usually attached to controller boxes, engine blocks, machine housings and the like by bolts. As every service man knows, when the conventional bolt is used for this application, it becomes a loose part when the access panel or door is removed. These often become lost because the service man is intent upon making the repair to the mechanism and not to upon saving the loose bolts.

Also, when assembling plates to machine housings and the like in initial manufacture, where the bolt is a loose part, the following condition exists. First, the plate is positioned in place by a crane, manually, or the like. If the plate is to be positioned vertically, a workman must hold it with one hand and then search about for the bolt or bolts by which it is permanently secured in place. This is troublesome, as every mechanic knows. The plate may shift while he is reaching for the bolt, and it must be realigned so that the bolt can then be driven home in the appropriate holes provided.

Present captive bolts available on the market today are complex units with rather costly components which, when assembled, present an unduly high profile or protrusion above the part or panel being mounted.

Still further, present captive bolts require elaborate and costly preparation and procedures to install to a removable panel.

From the foregoing, it is evident that a substantial advance to the art would be provided by a novel captive bolt construction wherein the bolt is maintained in "ready" position at all times so as to be immediately driven home upon alignment of parts, such as positioning an access panel on a machine housing; wherein the panel parts are simple and economical to manufacture; and wherein a low profile or protrusion above the parts is presented when the unit is in a panel securing position.

It is accordingly an important object of the present invention to provide a novel captive bolt system wherein the bolt is held in "ready" position to a plate or other structure containing a bolt hole.

A further object is to provide a novel captive bolt system for use with very thin plates and wherein the bolt is held in "ready" position so that the assembly side of the plate is free of any projection on the part of the bolt.

A still further object is to provide a novel captive bolt system applicable for use with access doors; for assembling panels to equipment cabinets; for assembling plates to equipment; and the like; wherein the assembled profile is very low as contrasted to units of the prior art.

A further object is to provide a novel captive bolt system wherein the bolt is held in "ready" position but never protrudes beyond the mounting surface of the plate or part to which attached when that plate or part is disengaged with a surface to which it is to be assembled. Thus, the present system allows sliding alignment and facilitates assembly, without any protrusions on the contact side of the plate.

A further object is to provide a novel captive bolt system wherein a support spring comprising part of the system is designed so that complete compression of the spring is provided, without coil overlap, to provide a low installed profile.

A further object is to provide a novel captive bolt system including a washer that not only secures the spring into a retainer by deformation ears of the retainer, but also completely encompasses the maximum diameter of the coil spring providing a positive entrapment of all components within the outside diameter of the washer.

Other objects of the invention will appear in the following description and appended claims, reference being had to the accompanying drawings forming a part of this specification wherein like reference characters designate corresponding parts in the several views.

FIGURE 1 is an exploded side elevational view, with some parts in section, of a typical, novel captive bolt system of invention;

FIGURE 2 is an assembled view of FIGURE 1, made by properly orienting the various components of FIGURE 1 on the bolt 10;

FIGURE 3 is a plan view of the retainer;

FIGURE 4 is a plan view of the washer;

Figure 5:
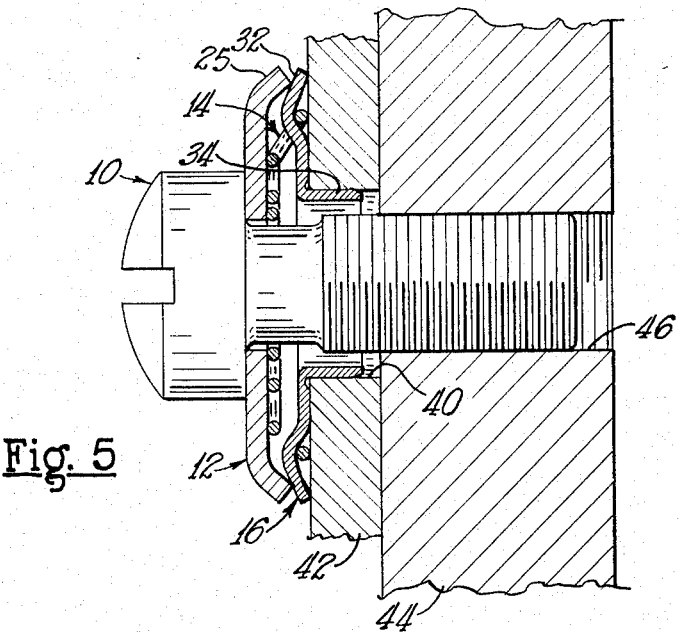
FIGURE 5 is a sectional view illustrating the captive bolt system of invention as it actually appears in place when the bolt is used to hold two plates together.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The invention in perspective

The captive bolt system of the present invention is typically comprised of a plurality of parts, namely, four in number. These parts are shown in the exploded side elevational and partially sectioned view of FIGURE 1, with the parts properly oriented relative to one another for assembly. At the left of FIGURE 1 is the bolt itself designated 10. Next is the washer 12 and the truncated conical coil spring 14. Next, to the right, is the retainer 16.

The washer 12 is also shown in plan view of FIGURE 4, and the retainer 16 in plan view in FIGURE 3.

An assembled view of the components is shown in FIGURE 2.

With the foregoing brief environmental resume, the specific configurations of the various components and the functional reasons for such configurations will now be set out as follows:

The bolt

This is sometimes referred to as a rolled thread unit wherein the thread 18, by the rolling operation, is elevated above the principal diameter 20 of the body 22 upon which the thread is formed. This is sometimes referred to as a Sems bolt. In actual practice the washer 12 is applied before the thread 18 is rolled, and thus the washer 12 becomes captive on the unit, as shown in FIGURE 2.

The washer

The washer 12 is of annular configuration and has a central hole 24 that is smaller than the major diameter of thread 18, but has a sliding fit on the unthreaded shank portion 26 that is left between the upper end of the thread 18 and the bottom side of the head 28. Accordingly, the washer is trapped when the thread 18 is formed.

Note that washer 12 is of annular configuration with a flat central body portion in which the central hole 24 is provided. At the outer edge, there is a downturned annular lip 25. This has a two-fold function as follows:

(1) It secures the spring, to be hereinafter described, in the retainer by the deformation of ears formed on the retainer; and (2) It completely encompasses the large diameter of the coil spring, providing a positive entrapment of all components within the outside diameter of the washer.

The spring

The spring 14 is of frusto-conical configuration and has the small end placed adjacent the head 28 of the bolt, as indicated in the assembled view of FIGURE 2. At the small end, the diameter of spring 14 is such that it provides a loose threading fit on the thread 18 of the bolt 10. The I.D. of the small end of the spring is essentially the same as the diameter of the hole in the washer. When run onto the shank portion 26, the small end of the spring has a sliding fit thereon. By being of such a diameter, it automatically becomes a loose thread fit on the thread portion 18.

By this arrangement, the bolt 10 and spring 14 are held operably to one another. At the bottom end the spring 14 is finished off as a planar construction with the offset 30 or hump at its large terminal end. This cooperates with the retainer 16 so that the spring 14 is captured by the retainer and cannot be spun out as a result of its thread-like helical construction. The diameter at the bottom end of the spring is less than the diameter of the annular lip of the washer so that upon full compression the spring is entirely enclosed within the confines of the washer.

The retainer

The retainer 16, as shown in FIGURE 3, is of annular configuration. As shown in the drawings, retainer 16 is provided with diametrically opposed ears 32. This is to be understood as illustrative only and not limiting on the invention, as one or more ears may be employed within the extended scope of invention. Actual use of the invention and testing will dictate the number of ears necessary for a particular application. These capture the bottom coil of spring 14, and one of them forms an abutment trapping the offset or hump portion 30, as indicated in the upper portion of FIGURE 3. It might be noted at this point that thread 18 of bolt 10 is of the right hand configuration, and the direction of spiral of the spring is a left hand thread. Although not essential, this relationship is preferred in most cases. In the alternative, the bolt can be of the left hand variety and spring 14 the opposite; and further it may be possible to have the spring wound the same as the bolt thread.

It will thus be noted that as the bolt 10 is tightened, the spring 14 has a tendency to be turned to the right viewing FIGURE 3. But the offset 30 is trapped, retaining the spring against rotation and thus holding it in place at a "home" position shown in FIGURE 3.

Retainer 16 also includes a tubular shank portion 34 and is radiused at 36 or slightly tapered to provide a guide by which it can be press-fitted into a clearance hole of a plate with which the captive bolt system of invention functions. A coined radius 38 is indicated at the top outside end of shank 34 to facilitate the cold draw by which the retainer 16 is suitably made.

Operation

Before discussing the operation of the device, it should be stated that the thread 18 holds the washer 12 in place because of the smaller diameter of central hole 24 of the washer. Spring 14 holds itself to the bolt by the fact that the small end is a slip fit on shank 26 of bolt 10 but smaller than the major diameter of the thread 18, though a loose thread fit relative thereto.

The principal intent of the present invention is to provide a pre-assembled bolt, washer and spring, with the retainer provided separately, and to be press-fitted or screwed into the parent panel using conventional assembly techniques. The pre-assembled bolt, washer and spring can then be attached to the retainer by expanding the bottom or large coil of the spring so as to engage under the locking ears of the retainer. Permanent attachment is achieved by either a mechanical deformation of the retainer ears or by the initial complete draw-down of the fastener by threading the bolt into the attachment medium. It is also feasible that all components could be supplied separately, i.e., a retainer, spring, and then bolt-washer.

Figure 6:
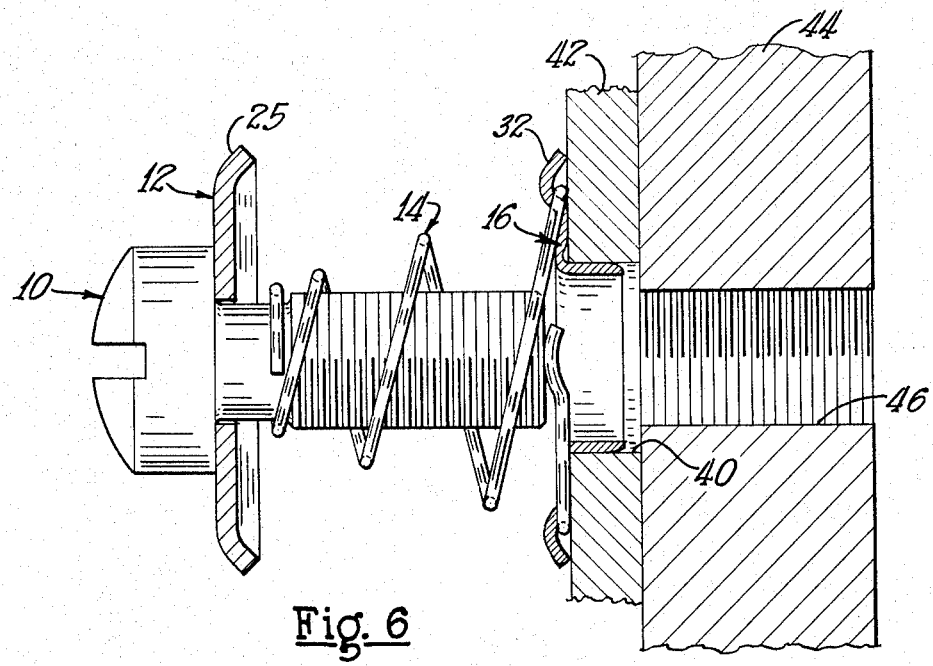
FIGURE 6 is a view similar to FIGURE 5, but with the bolt backed off to the "ready" position and the retainer press-fitted into the surface plate.

FIGURE 5 of the drawings shows a "home" position of the bolt as applied to hold two plates 42 and 44 together. FIGURE 6 shows a retracted position as for the removal of the left hand plate 42, simulating the removal of a cover plate from a machine housing for access to the interior thereof.

Both of these views show the shank end 34 of the retainer as pressed into hole 40 of outer plate 42. It is to be understood that this condition of parts has resulted from the bolt 10 having been driven home into secondary plate 44 at least one time, as shown in FIGURE 5.

Thus, it will be understood that this first application of the bolt to the plates 42 and 44 has been effective to do two things:

(1) Fasten the plates 42 and 44 together; and (2) At the same time the lip 25 of the washer forces down tabs 32 of the retainer thereby locking the spring into a captive position between the retainer and plate 42.

As shown in FIGURE 6, bolt 10 has been backed away to permit the outer plate 42 to be removed from plate 44, as in a service operation. Note, however, that this action does not cause the captive bolt assembly to fall away. Instead, the press-fit between retainer shank 34 and plate hole 40 retains the captive bolt assembly fastened to plate 42 for subsequent use. The bolt is in "ready" position.

At this point it should be noted relative to FIGURE 6 that there is no protrusion of the bolt 10 beyond the right side of plate 42. This permits plate 42 to be adjusted or displaced relative to plate 44 so that the bolt 10 can be lined up with the hole 46 in the secondary plate 44. This facilitates application of the plate 42 once it has been removed, or in initial assembly.

This feature is definitely advantageous, and, in the majority of cases, it will hold true. However, there will undoubtedly be instances where, because of excessive bolt length requirements, there will of necessity be an extension beyond the mounting surface of the parent panel. Also, if for some reason a protrusion is desirable, this may be accomplished by selection of a spring of reduced length.

After one bolt seating as in FIGURE 5, the spring is positively locked to the retainer by the deflection of the retainer ears, over in the manner indicated in FIGURES 5 and 6. Note this slight change of configuration of these ears from that shown in FIGURES 1 and 2.

Within the extended scope of invention, the anti-withdrawal feature of the spring, whether a hump, offset, or similar deformation, has been stated above as retaining the spring against rotation and holding it firmly in a fixed position. In the extended scope of invention, an overlying position of the ears relative to the spring of a sufficiently loose fit is to be encompassed as to allow a relative movement of the spring or hump of the spring within the peripheral span of the locking ears of the retainer.

Further, within the extended scope of invention, it is to be considered feasible to make the ears 32 as a substantially continuous lip around the periphery, but with a notched-out portion to receive the spring hump. By so operating, it is contemplated that the entire bolt assembly and retainer might be pre-assembled if desired and applied by properly positioning the shank end 34 relative to hole 40 and then running the bolt home, as shown in FIGURE 5. This will have the effect of compressing the lip of the retainer to force the shank end 34 thereof into hole 40 with a press-fit, and additionally to lock the spring down, providing the anti-withdrawal feature that has been mentioned hereinbefore.

The locking feature

Considerable locking action is effected by the axial forces exerted by the washer which is essentially a Belleville type, plus the resistance of the spring.

Advantages

The advantage of the invention in retaining the bolt 10 in a "ready" position relative to plate 42 for alignment purposes is clearly evident from FIGURE 6.

A further advantage of the invention is illustrated relative to FIGURE 5 wherein the overall height of the assembled unit provides a low profile only slightly higher than a conventional screw and washer assembly.

Thus, in addition to providing an always "ready" unit, the present invention presents a low, compact profile to avoid problems in clearance or interference.

A further advantage of the present invention is the simplicity and consequent economy of production.

Extended scope of invention

In the extended scope of invention, a bolt without a reduced shank portion 26 could be utilized. Thus the thread 18 could extend all the way to the bottom side of the head 28. The only requirement is that the head 28 be of a greater diameter than the threaded portion 18. In this regard, the extended scope of invention would use a bolt having a slotted head, hex head, square head, or other, or even an Allen socket head, if desired.

The washer 12 is to be understood as being either a separate item or as being an integral unit with the head of the bolt. Thus, a bolt head configured to the general sectional configuration of the washer is within the scope of invention.

Still further, within the extended scope of invention, the outside of the shank 34 of retainer 16 can be threaded to be a thread fit within the plate 42, FIGURE 6. Although a press fit is preferred, there may be instances within the scope of invention wherein it would be desired to have the threaded relationship.

I claim:
1. In a captive bolt system,
   a bolt having a head and a threaded body with a reduced diameter shank between the head and body,
   a washer movably mounted on said shank and having a hole of a diameter less than said thread major diameter,
   a coil spring on said bolt over said threaded body and having an end embracing said shank,
   said embracing end having an inside diameter greater than said shank but less than said threaded body,
   said washer having a sufficient diameter to embrace said spring,
   a retainer at the other end of said spring adjacent the free end of said threaded body,
   said retainer being of annular configuration and having an inside diameter to allow passage of said bolt,
   means on said retainer holding said retainer to said spring,
   and said retainer having a tubular shank of an inside diameter to accommodate said bolt and an outer contour to be fitted into a receiving aperture for said bolt.

2. In a captive bolt system,
   a bolt having a head and a threaded body with a reduced diameter shank between the head and body,
   a washer movable on said shank but having a hole of a diameter less than said thread to be retained on said shank,
   a conical spring on said bolt over said threaded body and having the small end embracing said shank,
   said small end having an inside diameter greater than said shank but less than said threaded body,
   said washer being of a diameter to embrace said spring,
   a retainer at the other, larger end of said spring adjacent the free end of said threaded body,
   said retainer being of an annular configuration and having an inside diameter to slidably accommodate said bolt,
   means on said retainer holding said retainer to said spring,
   and said retainer having a tubular shank of an inside diameter to slidably accommodate said bolt and an outer configuration to be fitted into a receiving aperture for said bolt.

3. In a captive bolt system,
   a bolt having a head and a threaded body of lesser diameter than said head,
   a coil spring carried around said body and having a smaller end and a larger end,
   said smaller end having an inside diameter less than the major diameter of said threaded body to slidably, but frictionally embrace said threaded body,
   a retainer carried on said spring in spaced relationship to said small end and adjacent the larger end,
   said retainer being of annular configuration and having an ear projecting radially beyond the periphery to embrace a coil of said spring,
   said retainer having a tubular shank axially spaced from said ear and of a diameter to slidably accommodate said bolt threaded portion,
   and means on a coil of said spring to abut said ear and hold said ear and coil relative to one another.

4. In a captive bolt system,
   a bolt having a head and a threaded body of a lesser diameter than said head,
   a coiled conical spring carried around said body and having a smaller end and a larger end,
   said smaller end having an inside diameter less than the major diameter of said threaded body to frictionally embrace said threaded body,
   a washer on said threaded body between said spring small end and said bolt head,
   said washer being of annular configuration and having an inside diameter to slide on said bolt body,
   said washer having a peripheral lip turned over axially and oriented away from said head,
   a retainer carried on said spring in spaced relationship to said small end and adjacent the larger end,
   said retainer being of annular configuration and having an ear projecting radially beyond the periphery to embrace a coil of said spring,
   said ear being in alignment with said washer lip for engagement therewith when said washer and retainer are moved axially into contacting relation,
   and said retainer having a tubular shank axially spaced from said ear and of a diameter to slidably accommodate said bolt threaded portion.

5. In a captive bolt system for use with a first plate means having a bolt-receiving hole, and a second plate means having a threaded bolt hole whereby a bolt slidably inserted through said first hole and run into said second hole is effective to secure said plates together,
   a bolt having a head and a threaded body of lesser diameter than said head,
   a coiled conical spring carried around said body and having a smaller end and a larger end,
   said smaller end having an inside diameter less than the major diameter of said threaded body to frictionally embrace said threaded body,
a washer carried on said threaded body between said spring small end and said bolt head,
said washer being of annular configuration and of an inside diameter to slide on said bolt body,
said washer having a peripheral lip turned over axially and extended away from said bolt head,
said large end of said spring being of a diameter less than said washer lip,
a retainer carried on said spring in axially spaced relationship from said small end and adjacent the larger end,
said retainer being of annular configuration and having diametrically opposed ears projecting radially beyond the periphery to embrace a coil of said spring,
said ears being aligned with said washer lip for engagement therewith when said bolt is run up into said plates,
and said retainer having a tubular shank axially spaced from said ears and of an inside diameter to slidably accommodate said bolt threaded portion and of an outer configuration to press-fit into said bolt-receiving hole.

References Cited by the Examiner

UNITED STATES PATENTS

| | | | |
|---|---|---|---|
| 1,398,036 | 11/1921 | Nichols | 292—251 |
| 1,664,820 | 4/1928 | Hughes | 151—69 |
| 2,201,793 | 5/1940 | Sanborn | 151—69 |
| 2,201,930 | 5/1940 | Stark | 151—38 |
| 2,372,653 | 4/1945 | Becket | 151—69 |

CARL W. TOMLIN, *Primary Examiner.*

MARION PARSONS, Jr., *Assistant Examiner.*